US011700156B1

(12) United States Patent
Zhou et al.

(10) Patent No.: US 11,700,156 B1
(45) Date of Patent: Jul. 11, 2023

(54) INTELLIGENT DATA AND KNOWLEDGE-DRIVEN METHOD FOR MODULATION RECOGNITION

(71) Applicant: Nanjing University of Aeronautics and Astronautics, Nanjing (CN)

(72) Inventors: Fuhui Zhou, Nanjing (CN); Rui Ding, Nanjing (CN); Ming Xu, Nanjing (CN); Hao Zhang, Nanjing (CN); Lu Yuan, Nanjing (CN); Qihui Wu, Nanjing (CN); Chao Dong, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 0 days.

(21) Appl. No.: 17/901,860

(22) Filed: Sep. 2, 2022

(30) Foreign Application Priority Data

Feb. 10, 2022 (CN) .......................... 202210123132.8

(51) Int. Cl.
| | | |
|---|---|---|
| *H04L 27/00* | (2006.01) | |
| *G06N 3/08* | (2023.01) | |
| *G06N 5/02* | (2023.01) | |

(52) U.S. Cl.
CPC ........... *H04L 27/0012* (2013.01); *G06N 3/08* (2013.01); *G06N 5/02* (2013.01)

(58) Field of Classification Search
CPC ......... H04L 27/0012; G06N 3/08; G06N 5/02
(Continued)

(56) References Cited

U.S. PATENT DOCUMENTS

| | | | |
|---|---|---|---|
| 6,849,855 B1 | 2/2005 | Shih et al. | |
| 7,171,161 B2 * | 1/2007 | Miller | ................. H04L 27/0012 |
| | | | 455/67.11 |

(Continued)

FOREIGN PATENT DOCUMENTS

| | | |
|---|---|---|
| CN | 107547460 A | 1/2018 |
| CN | 110309854 A | 10/2019 |

(Continued)

OTHER PUBLICATIONS

Wang Feiyang, Research on Communication Signal Modulation Recognition Based on Deep Learning, A Master Thesis Submitted to University of Electronic Science and Technology of China, 2019, pp. 1-60.

(Continued)

*Primary Examiner* — Juan A Torres
(74) *Attorney, Agent, or Firm* — Bayramoglu Law Offices LLC (57) ABSTRACT

An intelligent data and knowledge-driven method for modulation recognition includes the following steps: collecting spectrum data; constructing corresponding attribute vector labels for different modulation schemes; constructing and pre-training an attribute learning model based on the attribute vector labels for different modulation schemes; constructing and pre-training a visual model for modulation recognition; constructing a feature space transformation model, and constructing an intelligent data and knowledge-driven model for modulation recognition based on the attribute learning model and the visual model; transferring parameters of the pre-trained visual model and the pre-trained attribute learning model and retraining the transformation model; and determining whether training on a network is completed and outputting a classification result. The intelligent data and knowledge-driven method for modulation recognition significantly improves the recognition accu- (Continued)

racy at low SNRs and reduces the confusion between higher-order modulation schemes.

3 Claims, 9 Drawing Sheets

(58) Field of Classification Search
USPC .......................................................... 455/102
See application file for complete search history.

(56) References Cited

U.S. PATENT DOCUMENTS

| 10,296,831 | B2* | 5/2019 | O'Shea | G06N 3/045 |
| 2004/0204878 | A1* | 10/2004 | Anderson | H04L 27/0012 |
| | | | | 702/66 |
| 2020/0252412 | A1* | 8/2020 | Prasad Koppisetti | |
| | | | | G01R 29/023 |
| 2022/0147771 | A1* | 5/2022 | Bae | G06V 10/763 |

FOREIGN PATENT DOCUMENTS

| CN | 111935043 A | 11/2020 |
| CN | 113259288 A | 8/2021 |
| CN | 113269077 A | 8/2021 |
| CN | 113537306 A | 10/2021 |

OTHER PUBLICATIONS

Hao Zhang, et al., Automatic Modulation Classification Using Involution Enabled Residual Networks, IEEE Wireless Communications Letters, 2021, pp. 2417-2420, vol. 10, No. 11.
Timothy James O'Shea, et al., Over-the-Air Deep Learning Based Radio Signal Classification, IEEE Journal of Selected Topics in Signal Processing, 2018, pp. 168-179, vol. 12, No. 1.
Yu Wang, et al., LightAMC: Lightweight Automatic Modulation Classification via Deep Learning and Compressive Sensing, IEEE Transactions on Vehicular Technology, 2020, pp. 3491-3495, vol. 69, No. 3.

* cited by examiner

INTELLIGENT DATA AND KNOWLEDGE-DRIVEN METHOD FOR MODULATION RECOGNITION

CROSS REFERENCE TO THE RELATED APPLICATIONS

This application is based upon and claims priority to Chinese Patent Application No. 202210123132.8, filed on Feb. 10, 2022, the entire contents of which are incorporated herein by reference.

TECHNICAL FIELD

The present disclosure belongs to the field of communication technologies, and relates to an intelligent data and knowledge-driven method for modulation recognition.

BACKGROUND

Intelligent modulation recognition is a crucial technology in intelligent wireless communication, which distinguishes different types of modulation signals by learning unique features of received signals. With the gradual popularization of 5G, research on 6G wireless communication networks is ramping up. The intelligent communication technology, such as intelligent modulation recognition, is as a key component of 6G communication networks that requires in-depth study. Therefore, it is crucial to conduct research on intelligent modulation recognition. In addition, modulation recognition has been widely used in both military and civilian fields. In military applications, modulation recognition helps to recover transmission information to generate interference signals matching the modulation scheme. In civilian applications, modulation recognition helps to select a correct demodulation scheme to ensure the correct information recovery. Currently, there are two types of intelligent modulation recognition methods, that is, the model-driven method and the data-driven method. In the model-driven method, such as the likelihood function-based method, the modulation type of the received signal is determined through comparing the magnitudes of different test statistics. This method has high computational complexity in estimating the unknown parameters and poor classification performance in complex and dynamic real-world communication scenarios. The classification accuracy of the method is especially low at low signal-to-noise ratios (SNRs).

The data-driven method has attracted much attention due to its powerful feature learning capability. Tim O'Shea, Tamoghna Roy et al. proposed in the paper "Over the Air Deep Learning Based Radio Signal Classification" (*IEEE J. Sel. Topics Signal Process.*, no. 1, pp. 168-179, 2018) a residual neural network, which can alleviate, through residual learning with skip connections, the overfitting problem during training deep networks. However, this huge network architecture requires great time cost and computational resources in the training phase. Yu Wang, Jie Yang et al. proposed in the paper "LightAMC: Lightweight Automatic Modulation Classification via Deep Learning and Compressive Sensing" (*IEEE Trans. Veh. Technol.*, vol. 69, no. 3, pp. 3491-3495, 2020) a lightweight intelligent network model for modulation recognition, which improves the computational speed by reducing the network size but has poor recognition performance at low SNRs. The patent application, "Deep Learning-Based Modulation Recognition Method" (Application No. CN201710720483.6, Application Publication No. CN107547460A) filed by Xidian University, discloses a deep learning-based adaptive modulation recognition method. In this method, a plurality of training subsets are divided and used for training the deep network at different SNRs to realize SNR-based adaptive modulation recognition. This method improves the modulation recognition accuracy at low SNRs to a certain extent, but the improvement is limited.

These purely data-driven methods all depend on a large number of training samples and are difficult to implement in complex real-world communication systems. In addition, the current modulation recognition methods have low recognition accuracy at low SNRs, causing difficulty in their application in complex real-world communication networks. Finally, the confusion between higher-order modulation schemes is a challenge encountered by many modulation recognition methods at present. Therefore, there is an urgent need to develop new intelligent modulation recognition methods.

SUMMARY

The present disclosure addresses the problems that the existing modulation recognition technologies have poor performance in complex and dynamic real-world scenarios and depend on a large number of training samples, and the higher-order modulation schemes are severely confused. The present disclosure proposes an intelligent data and knowledge-driven method for modulation recognition. In the method, semantic attributes are introduced as knowledge and attribute features are embedded into a visual feature space through a transformation model, which greatly improves the modulation recognition accuracy at low SNRs, reduces the confusion between higher-order modulation schemes in the recognition process, and can reduce the dependence on the training data.

To achieve the above objective, the present disclosure adopts the following technical solution:

An intelligent data and knowledge-driven method for modulation recognition, includes the following steps:

step (1): collecting spectrum data;

step (2): constructing corresponding attribute vector labels for different modulation schemes;

step (3): constructing and pre-training an attribute learning model based on the attribute vector labels for different modulation schemes;

step (4): constructing and pre-training a visual model for modulation recognition;

step (5): constructing a feature space transformation model, and constructing an intelligent data and knowledge-driven model for modulation recognition based on the attribute learning model and the visual model;

step (6): transferring parameters of the pre-trained visual model and the pre-trained attribute learning model and retraining the transformation model;

step (7): determining whether training on a network is completed; and if yes, performing step (8); or if not, increasing a number of training iterations by 1 and retraining the transformation model;

step (8): inputting test set data into the network; and step (9): outputting a classification result.

In order to optimize the technical solution, the following specific measures are also used.

The collecting spectrum data in the step (1) specifically includes: treating modulation classification as a K class hypothesis testing problem, and indicating a received signal in a $k^{th}$ modulation hypothesis as $x_k(n)=s_k(n)+\omega_k(n)$, where $s_k(n)$ indicates an $n^{th}$ sample point of a transmitted signal of a $k^{th}$ modulation scheme, $x_k(n)$ indicates an $n^{th}$ sample point of a received signal of the $k^{th}$ modulation scheme, and $\omega_k(n)$ indicates an additive white Gaussian noise with a mean of 0 and a variance of $\sigma^2$; indicating the received signal as a vector consisting of I/Q components, where $x_k=I_k+Q_k$, $x_k$ indicates a vector of $x_k(n)$, and $I_k$ and $Q_k$ respectively indicate in-phase and quadrature components of the signal; and performing determining in a K class modulation scheme based on I/Q signal samples.

The constructing corresponding attribute vector labels for different modulation schemes in the step (2) specifically includes: using binary phase shift keying, quaternary phase shift keying, 16 quadrature amplitude modulation and 64 quadrature amplitude modulation as recognition objects to construct a six-dimensional attribute feature vector. Each dimension indicates a different meaning, A first dimension indicates whether a base number of a classification target is binary. A second dimension indicates whether the base number of the classification target is quaternary. A third dimension indicates whether the base number of the classification target is hexadecimal. A fourth dimension indicates whether the base number of the classification target is base 64. A fifth dimension indicates whether the classification target is phase shift keying. A sixth dimension indicates whether the classification target is quadrature amplitude modulation.

The constructing and pre-training an attribute learning model based on the attribute vector labels for different modulation schemes in the step (3) specifically includes: obtaining the attribute learning model by modifying an existing residual neural network. A residual unit consists of two convolutional layers with a kernel size of 3×3. A batch normalization layer standardizes intermediate data in the middle layer of the network. A linear correction unit is connected after each batch normalization layer as an activation function to introduce nonlinearity into the network. A residual stack unit is constructed by sequentially connecting one 1×1 convolutional layer, two residual units, and one maximum pooling layer. The convolutional layer and the residual units are used for feature extraction, and the maximum pooling layer is used to compress features to reduce feature dimensionalities.

When the attribute learning model is trained, trainable parameters of the network are randomly initialized. An initialized number of network training epochs is 1. A maximum number of epochs is 50, and a learning rate is 0.001. A stochastic gradient descent (SGD) optimization algorithm is configured as a network training optimizer. A mean squared error (MSE) loss function is selected to calculate a difference between network output and a real attribute label.

The constructing and pre-training a visual model for modulation recognition specifically includes: forming the visual training model by a multi-scale module, a global average pooling layer, a fully connected layer and a classification layer. The multi-scale module first uses a convolutional layer with a kernel size of 3×1 and a stride of 2 to reduce the feature dimensionalities, then uses a plurality of convolutional layers with different kernel sizes to learn multidimensional features, and finally splices the multidimensional features. A fully connected layer with the linear correction unit as the activation function is used after the global average pooling layer to reduce the feature dimensionalities, and the expression of the activation function is as follows:

$$f(z)=\max(0,z)$$

$\max(\bullet)$ indicates calculating a maximum value of an object in the parentheses, z indicates input data of the activation function.

When the visual model is trained, the trainable parameters of the network are randomly initialized. The initialized number of network training epochs is 1. The maximum number of iterations is 20, and the learning rate is 0.001. An Adam optimization algorithm is configured as the network training optimizer, and a cross-entropy loss function is selected to calculate the difference between the network output and the real attribute label.

The constructing a feature space transformation model, and constructing an intelligent data and knowledge-driven model for modulation recognition based on the attribute learning model and the visual model in the step (5) specifically includes:

obtaining a first branch as a visual coding branch by removing a last classification layer of the visual model, specifically, inputting I/Q raw data I to the visual coding branch; extracting, by the multi-scale module, multidimensional features of the input data; flattening, by the global average pooling layer, the multidimensional features; and outputting, by the fully connected layer, a D-dimensional feature vector $\phi_1(I_i)\in\mathbb{R}^{D\times 1}$;

performing, by a second branch consisting of the attribute learning model, attribute semantic embedding, where inputting the raw data $I_i$, and outputting an L-dimensional attribute feature vector $\phi_2(I_i)\in\mathbb{R}^{L\times 1}$; and transferring attribute features to a visual feature space by the transformation model, where the transformation model consists of two fully connected layers with linear correction units as activation functions, the L-dimensional attribute feature vector $\phi_2(I_i)$ is configured as input, the transformation model outputs an embedding vector $\phi_3(\phi_2(I_i))\in\mathbb{R}^{D\times 1}$ of the same dimension as a visual feature, and the output of the transformation model is as follows:

$$\phi_3(\phi_2(I_i))=f_2(W_2f_1(W_1\phi_2(I_i)))$$

$W_1\in\mathbb{R}^{L\times M}$ indicates a weight matrix of a first fully connected layer, $W_2\in\mathbb{R}^{M\times D}$ indicates a weight matrix of a second fully connected layer, and $f_1(\bullet)$ and $f_2(\bullet)$ respectively indicate the activation functions connected behind the two fully connected layers and are used to introduce nonlinearity to the network structure. M indicates an output dimension of the first fully connected layer, which is equal to an input dimension of the second fully connected layer.

The transferring parameters of the pre-trained visual model and the pre-trained attribute learning model and retraining the transformation model in the step (6) specifically includes:

first, fixing the network parameters of the pre-trained visual model and the pre-trained attribute learning model;

second, randomly initializing the trainable parameters of the network, where the initialized number of network training epochs is 1, the maximum number of iterations is 100, the learning rate is 0.001, and the Adam optimization algorithm is configured as the network training optimizer; and third, inputting the training data in batches into the network for training, where a batch size is adjustable, a training error of each batch is back-propagated to optimize the network parameters, each fully connected layer has an $\iota_2$ parameter regularization loss term, the output of two branches passes a least square loss function to minimize a difference between the embedding output and the visual feature output, and the expression of the loss function is as follows:

$$L(W_1, W_2) = \frac{1}{N}\sum_{i=1}^{N}\|\phi_1(I_i) - f_1(W_2 f_1(W_1 \phi_2(I_i)))\|^2 + \lambda(\|W_1\|^2 + \|W_2\|^2)$$

N indicates a number of training samples, $\lambda$ is a hyperparametric weight of two parameter regularization losses with respect to the embedding loss, and one training epoch is completed when all batches of data in the training data are back-propagated.

The present disclosure has the following advantages:

First, the present disclosure introduces attribute semantics as the knowledge of the new modulation recognition framework, which reduces the dependence on the training samples compared to the traditional deep learning framework.

Second, the improved residual network structure designed in the present disclosure has lower network complexity, which improves the network training speed while ensuring the performance, thereby ensuring the real-time requirements in practical communication scenarios.

Third, the data and knowledge-driven network structure can significantly improve the recognition accuracy at low SNRs.

Fourth, the confusion between higher-order modulation schemes is significantly reduced compared to the traditional recognition methods.

BRIEF DESCRIPTION OF THE DRAWINGS

FIGS. 2A-2C are framework diagrams showing an attribute learning model of the present disclosure.

FIGS. 7A and 7B are diagrams showing comparison between confusion matrixes of the present disclosure and other existing technologies.

DETAILED DESCRIPTION OF THE EMBODIMENTS

The embodiments of the present disclosure are further described in detail below with reference to the accompanying drawings.

Figure 1:
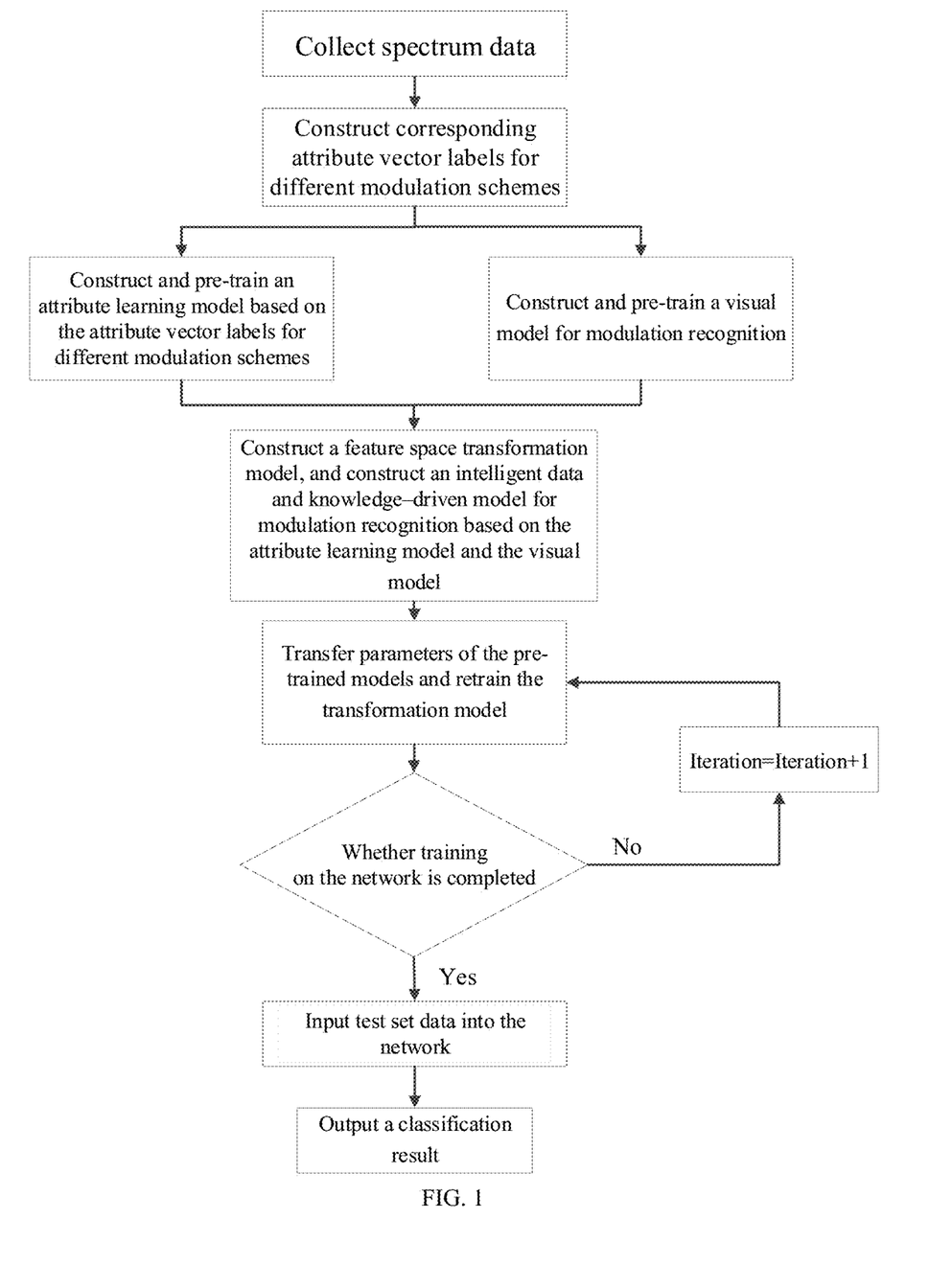
FIG. 1 is a flowchart of the present disclosure.

Specific steps of the method of the present disclosure are described below with reference to FIG. 1.

Step 1: Collect spectrum data.

The modulation classification may be treated as a K class hypothesis testing problem. A received signal in a $k^{th}$ modulation hypothesis may be indicated as $x_k(n) = s_k(n) + \omega_k(n)$. $s_k(n)$ indicates an $n^{th}$ sample point of a transmitted signal of a $k^{th}$ modulation scheme, $x_k(n)$ indicates an $n^{th}$ sample point of a received signal of the $k^{th}$ modulation scheme, and $\omega_k(n)$ indicates an additive white Gaussian noise with a mean of 0 and a variance of $\sigma^2$. The received signal is indicated as a vector consisting of I/Q components, where $x_k = I_k + Q_k$, $x_k$ indicates a vector of $x_k(n)$, and $I_k$ and $Q_k$ respectively indicate in-phase and quadrature components of the signal. Determining is performed in a K class modulation scheme based on I/Q signal samples.

Step 2: Construct corresponding attribute vector labels for different modulation schemes.

In the present disclosure, binary phase shift keying, quaternary phase shift keying, 16 quadrature amplitude modulation and 64 quadrature amplitude modulation are used as recognition objects. Therefore, a six-dimensional attribute feature vector is constructed, and each dimension indicates a different meaning. A first dimension indicates whether a base number of a classification target is binary, a second dimension indicates whether the base number of the classification target is quaternary, a third dimension indicates whether the base number of the classification target is hexadecimal, a fourth dimension indicates whether the base number of the classification target is base 64, a fifth dimension indicates whether the classification target is phase shift keying, and a sixth dimension indicates whether the classification target is quadrature amplitude modulation.

Step 3: Construct and pre-train an attribute learning model based on the attribute vector labels for different modulation schemes.

Figure 2A:
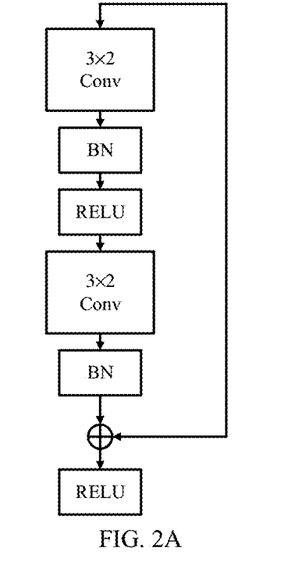
FIG. 2A is a residual unit.
Figure 2B:
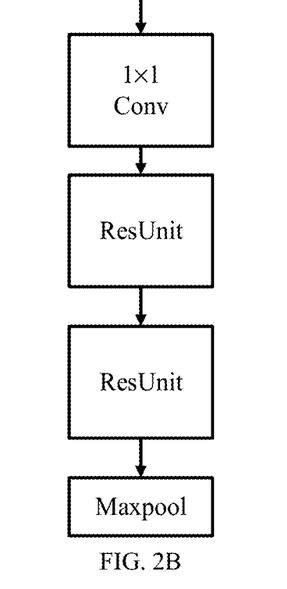
FIG. 2B is a residual stack module.
Figure 2C:
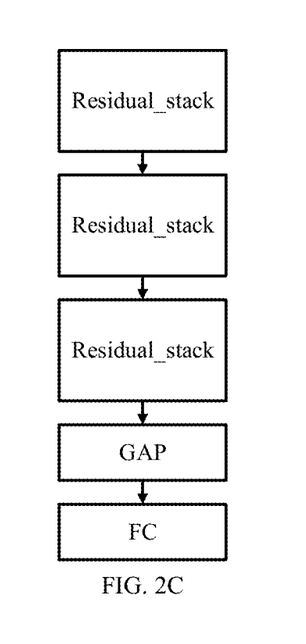
FIG. 2C is a complete attribute learning model.

The attribute learning model of the present disclosure is obtained by modifying an existing residual neural network. A residual unit consists of two convolutional layers with a kernel size of 3×3. A batch normalization layer standardizes intermediate data in the middle layer of the network, thus avoiding the problem of gradient disappearance due to the saturation of partial derivatives with respect to intermediate variables. Finally, a linear correction unit is connected after each batch normalization layer as an activation function to introduce nonlinearity into the network. A residual stack unit is constructed by sequentially connecting one 1×1 convolutional layer, two residual units, and one maximum pooling layer. The convolutional layer and the residual units are used for feature extraction, and the maximum pooling layer is used to compress features to reduce feature dimensionalities. The complete attribute learning model consists of three residual stack modules, one global average pooling layer, and one fully connected layer that are sequentially connected. The global average pooling layer is used to average output of different channels. Compared with a fully connected layer used in a traditional convolutional neural network, the global average pooling layer has no parameters to be trained. This can significantly reduce the number of global parameters of the network, which can avoid the overfitting problem during training.

Since the attribute learning task goes beyond the specific modulation classification task, the attribute learning model can be pre-trained separately and the training data is no longer limited to the modulation classification dataset.

When the attribute learning model is trained, trainable parameters of the network are randomly initialized. An initialized number of network training epochs is 1, a maximum number of epochs is 50, and a learning rate is 0.001. An SGD optimization algorithm is configured as a network training optimizer. Since the attribute learning task is different from the classification task, an MSE loss function is selected to calculate a difference between network output and a real attribute label.

Step 4: Construct and pre-train a visual model for modulation recognition.

Figure 3:
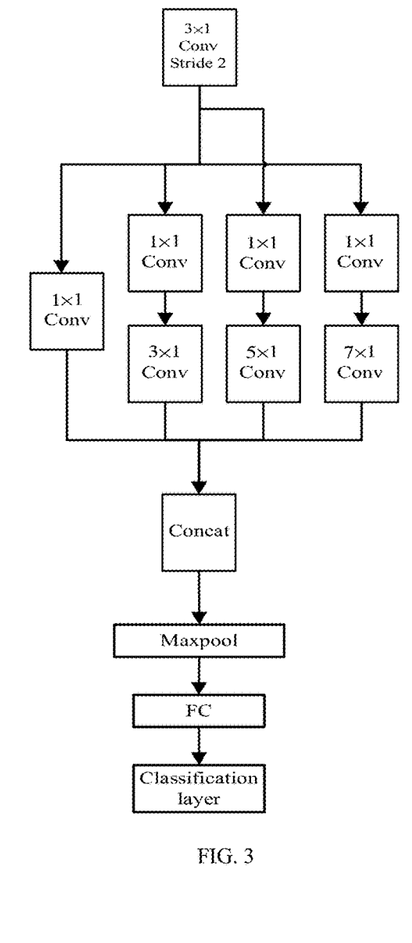
FIG. 3 is a framework diagram of a visual learning module according to the present disclosure.

The visual training model is formed by a multi-scale module, a global average pooling layer, a fully connected layer and a classification layer. The multi-scale module first uses a convolutional layer with a kernel size of 3×1 and a stride of 2 to reduce the feature dimensionalities, then uses a plurality of convolutional layers with different kernel sizes to learn multidimensional features, and finally splices the multidimensional features. A fully connected layer in the traditional network is replaced by the global average pooling layer to average the output feature of each channel. A fully connected layer with the linear correction unit as the activation function is used after the global average pooling layer to reduce the feature dimensionalities. The expression of the activation function is as follows:

$$f(z) = \max(0, z)$$

max(•) indicates calculating a maximum value of an object in the parentheses. Because the linear correction unit used as the activation function can set values of some neurons to zero, the sparsity of the neural network can be increased and the interdependence between parameters can be reduced. In this way, the overfitting problem during the training process can be alleviated. In addition, unlike other activation functions, the linear correction unit used as the activation function does not have a saturation region, such that the gradient disappearance problem can be alleviated.

When the visual model is trained, the trainable parameters of the network are randomly initialized. The initialized number of network training epochs is 1, the maximum number of iterations is 20, and the learning rate is 0.001. An Adam optimization algorithm is configured as the network training optimizer. A cross-entropy loss function is selected to calculate the difference between the network output and the real attribute label.

Figure 4:
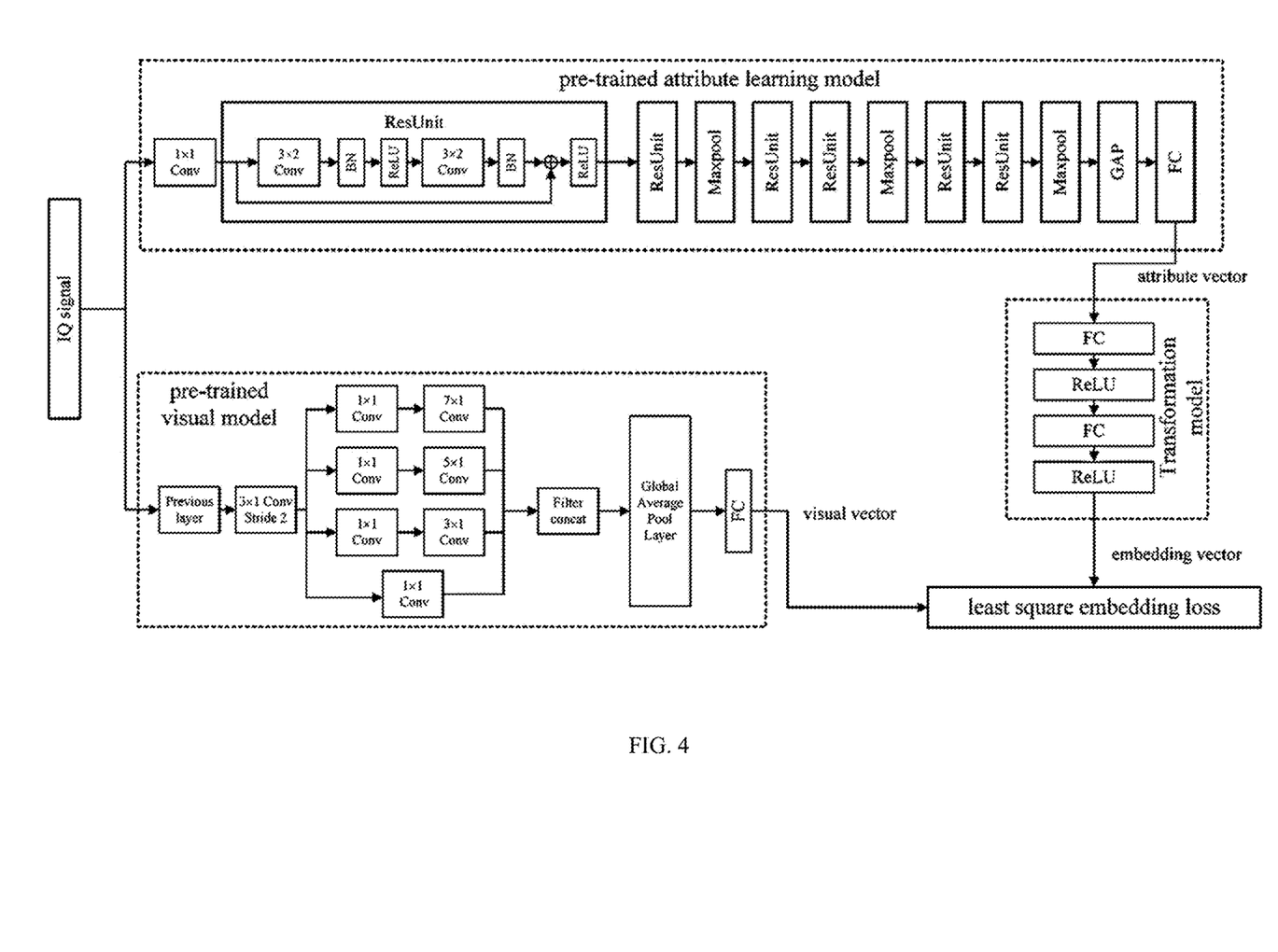
FIG. 4 is a general block diagram of a data and knowledge-driven network according to the present disclosure.

Step 5: Construct a feature space transformation model, and construct an intelligent data and knowledge-driven model for modulation recognition based on the attribute learning model and the visual model.

A first branch is a visual coding branch and is obtained by removing a last classification layer of the visual model. First, I/Q raw data $I_i$ is input to the visual coding branch, the multi-scale module extracts multidimensional features of the input data, the global average pooling layer flattens the multidimensional features, and finally the fully connected layer outputs a D-dimensional feature vector $\phi_1(I_i) \in \mathbb{R}^{D \times 1}$.

A second branch performs attribute semantic embedding and consists of the attribute learning model. The raw data $I_i$ is input, and finally an L-dimensional attribute feature vector $\phi_2(I_i) \in \mathbb{R}^{L \times 1}$ is output.

Finally, visual features and attribute features are mapped to a visual-semantic joint embedding space. In the present disclosure, a visual feature space is selected as the embedding space, which can effectively avoid centrality. Specifically, the attribute features are transferred to the visual feature space by the transformation model. The transformation model consists of two fully connected layers with linear correction units as activation functions. The L-dimensional attribute feature vector $\phi_2(I_i)$ is configured as input, and the transformation model outputs an embedding vector $\phi_3(\phi_2(I_i)) \in \mathbb{R}^{d \times 1}$ of the same dimension as a visual feature. In order to describe the operation process of the transformation model in detail, the output of the transformation model is as follows $$\phi_3(\phi_2(I_i)) = f_2(W_2 f_1(W_1 \phi_2(I_i)))$$

$W_1 \in \mathbb{R}^{L \times M}$ indicates a weight matrix of a first fully connected layer, $W_2 \in \mathbb{R}^{M \times D}$ indicates a weight matrix of a second fully connected layer, and $f_1(\cdot)$ and $f_2(\cdot)$ respectively indicate the activation functions connected behind the two fully connected layers and are used to introduce non-linearity to the network structure.

Different from the traditional data-driven architecture, the solution proposed in the present disclosure constructs the transformation model to map the semantic attribute features to the visual feature space. The combination of attribute feature knowledge can improve the performance of the model at low SNRs. Meanwhile, the training speed of the proposed solution can be improved because both the visual model and the attribute learning model are pre-trained and only the transformation model needs to be trained end-to-end. The introduction of attribute knowledge can reduce the training data required by the visual model. Different from abstract visual features, attribute feature labels consisting of deterministic binary variables have a clear physical meaning.

Step 6: Transfer parameters of the pre-trained models and retrain the transformation model.

First, the network parameters of the pre-trained visual model and the pre-trained attribute learning model are fixed.

Second, the trainable parameters of the network are randomly initialized, where the initialized number of network training epochs is 1, the maximum number of iterations is 100, the learning rate is 0.001, and the Adam optimization algorithm is configured as the network training optimizer.

Third, the training data is input in batches into the network for training, where a batch size is adjustable, and a training error of each batch is back-propagated to optimize the network parameters. Each fully connected layer has an $l_2$ parameter regularization loss term, and the output of two branches passes a least square loss function to minimize a difference between the embedding output and the visual feature output. The expression of the loss function is as follows:

$$L(W_1, W_2) = \frac{1}{N} \sum_{i=1}^{N} \|\phi_1(I_i) - f_1(W_2 f_1(W_1 \phi_2(I_i)))\|^2 + \lambda(\|W_1\|^2 + \|W_2\|^2)$$

N indicates a number of training samples, and $\lambda$ is a hyperparametric weight of two parameter regularization losses with respect to the embedding loss. One training epoch is completed when all batches of data in the training data are back-propagated.

Step 7: Determine whether training on the network is completed.

Whether the current training epoch has reached the maximum number of training epochs is determined. If yes, step 8 is performed. If not, network training in step 7 is performed.

Step 8: Input test set data into the network.

Step 9: Output a classification result.

The following further describes the effects of the present disclosure with reference to simulation tests.

1. Simulation conditions and parameter settings:

The simulation tests of the present disclosure are conducted on the simulation platform of Python 3.6, Pytorch 1.5.1. The computer CPU model is Intel Core i7, with a discrete graphics card of NVIDIA GeForce GTX 1660 SUPER. The dataset is the publicly available dataset RadioML 2016.10A, which includes modulation signal samples at different SNRs from −20 dB to 20 dB, with 128 sample points for each modulation scheme. In the present disclosure, binary phase shift keying, quaternary phase shift keying, 16 quadrature amplitude modulation and 64 quadrature amplitude modulation are used, and the SNRs range from −18 dB to 12 dB with a stride of 2 dB.

Figure 5:
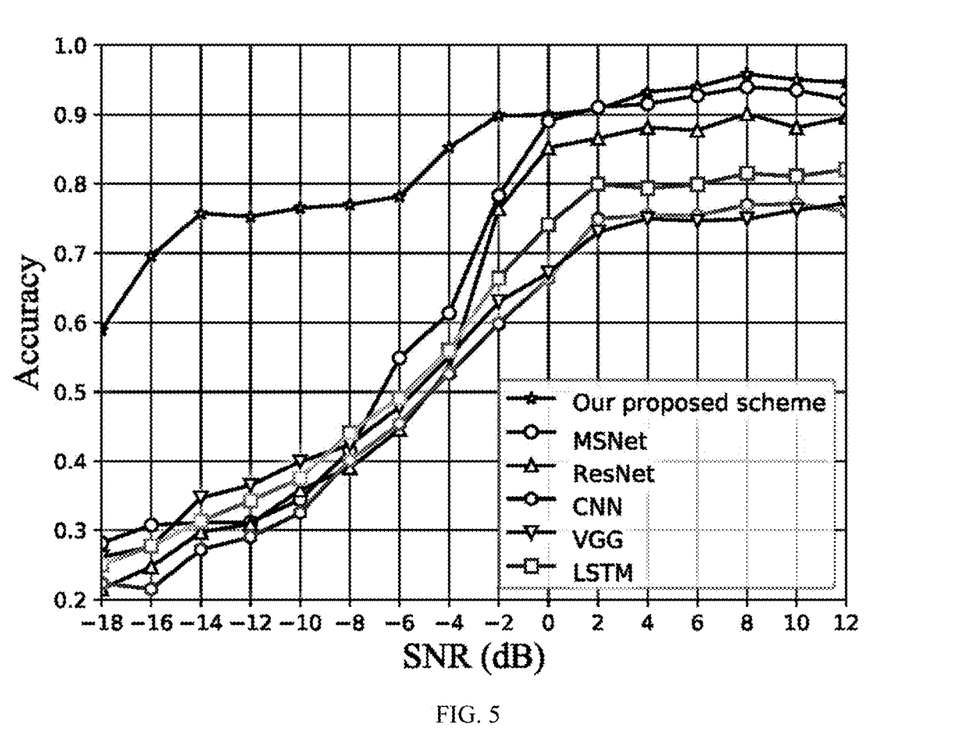
FIG. 5 is a diagram of comparison between classification accuracy at different SNRs of the present disclosure and other existing technologies.

2. Simulation content:

FIG. 5 is a diagram of comparison between classification accuracy at different SNRs of the present disclosure and existing technologies. In FIG. 5, the horizontal coordinates indicate the different SNRs (dB), and the vertical coordinates indicate the recognition accuracy. The broken line marked with a pentagram indicates the classification accuracy curve in the method of the present disclosure. The broken line marked with a circle indicates the classification accuracy curve of the multi-scale network at different SNRs. The broken line marked with a triangle indicates the classification accuracy curve of the residual network at different SNRs. The broken line marked with a rectangle indicates the classification accuracy curve of the long short-term memory neural network at different SNRs. The broken line marked with an inverted triangle indicates the classification accuracy curve of the Visual Geometry Group network (VGG) at different SNRs. The SNRs vary from −18 dB to 12 dB. The comparison shows that the classification accuracy of the present disclosure is significantly higher than those of other existing methods, especially at low SNRs. When the SNR is −18 dB, the classification accuracy of the present disclosure reaches about 59%, which exceeds the accuracy of the large-scale network-based method by about 28% and the residual network-based method by about 35%. When the SNR is −14 dB, the classification accuracy of the present disclosure reaches about 77%, which exceeds the accuracy of the VGG-based method by about 42% and the large-scale network-based method by about 47%. When the SNR is about 8 dB, the classification accuracy of the method of the present disclosure gradually reaches saturation at about 95%.

Figure 6:
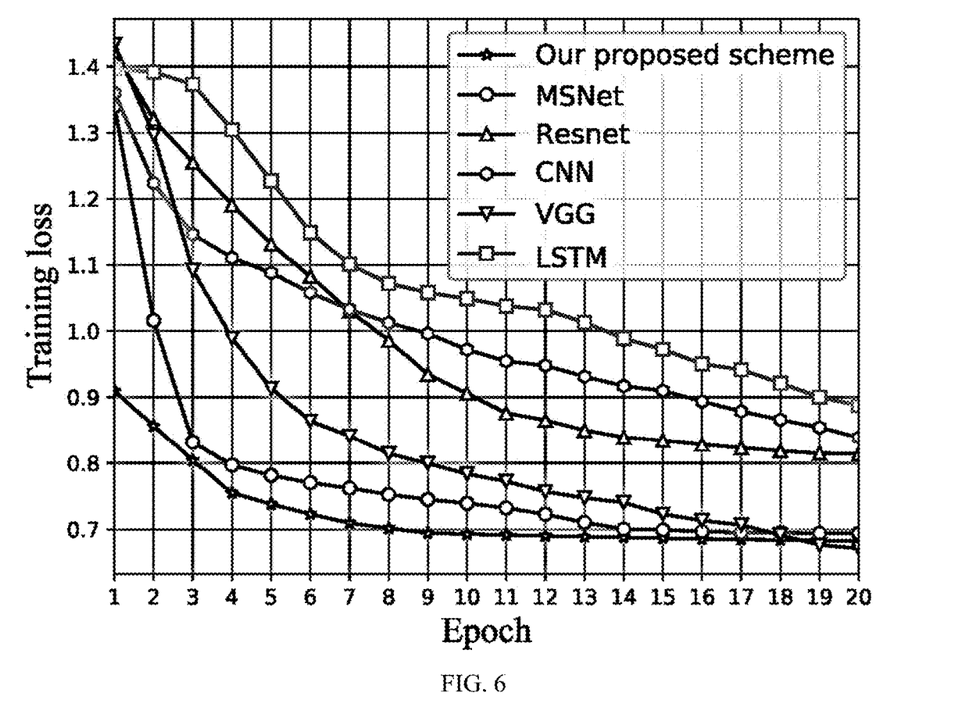
FIG. 6 is a diagram of comparison between training convergence speeds of the present disclosure and other existing technologies.

FIG. 6 is a diagram of comparison between network training speeds of the present disclosure and existing technologies. In FIG. 6, the horizontal coordinates indicate the numbers of epochs (times) and the vertical coordinates indicate the values of the loss function. The broken line marked with a pentagram indicates the loss function curve in the method of the present disclosure. The broken line marked with a circle indicates the loss function curve of the multi-scale network at different SNRs. The broken line marked with a triangle indicates the loss function curve of the residual network at different SNRs. The broken line marked with a rectangle indicates the loss function curve of the long short-term memory neural network at different SNRs. The broken line marked with an inverted triangle indicates the loss function curve of the VGG at different SNRs. By comparing the training speed convergence curves of the several methods, it can be seen that the training speed of the method of the present disclosure is significantly faster than those of the other existing methods. The method of the present disclosure completes convergence at about the eighth training epoch. The multi-scale network and the residual network complete convergence at about the 15$^{th}$ training epoch. The loss functions of VGG and the long short-term memory neural network still do not fully converge until the 20$^{th}$ training epoch.

Figure 7A:
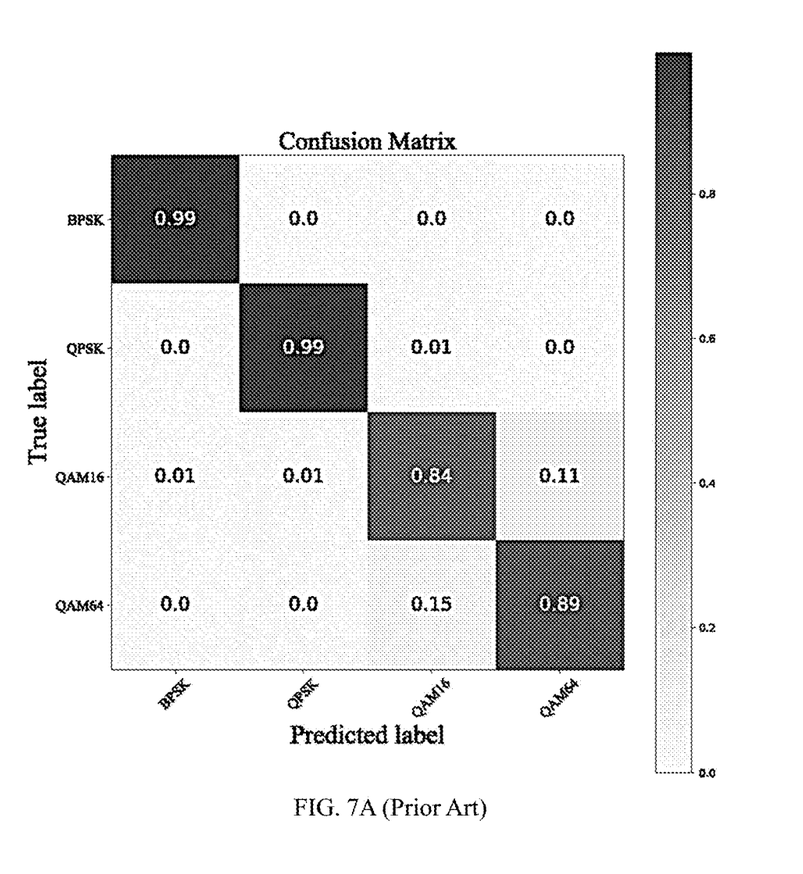
FIG. 7A shows a classification result of a traditional data-driven method.
Figure 7B:
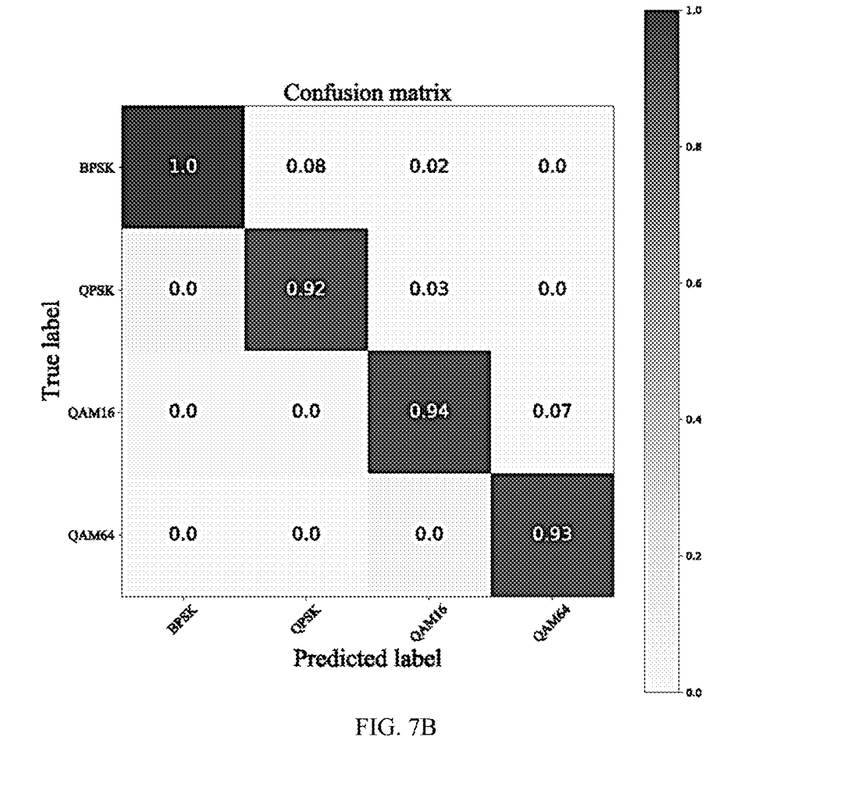
FIG. 7B shows a classification result of the present disclosure.

FIGS. 7A and 7B are diagrams showing comparison between confusion matrixes of the present disclosure and other existing technologies. The horizontal coordinates indicate the network output results, the vertical coordinates indicate the true labels, and the numbers in the grids indicate corresponding classification accuracy. It can be seen that the confusion between the 16 quadrature amplitude modulation and the 64 quadrature amplitude modulation is significantly reduced in the method of the present disclosure than the multi-scale network.

Based on the above simulation results and analysis, the intelligent data and knowledge-driven network framework for modulation recognition proposed in the present disclosure can achieve higher classification accuracy and faster convergence, and reduce the confusion between higher-order modulation schemes in the classification process than the existing methods.

What is described above is merely the preferred implementation of the present disclosure. The scope of protection of the present disclosure is not limited to the above examples, and all technical solutions following the idea of the present disclosure fall within the scope of protection of the present disclosure. It should be noted that several modifications and adaptations made by those of ordinary skill in the art without departing from the principle of the present disclosure should fall within the scope of protection of the present disclosure.

What is claimed is:

1. An intelligent data and knowledge-driven method for a modulation recognition, comprising the following steps:
   step (1): collecting spectrum data;
   step (2): constructing corresponding attribute vector labels for different modulation schemes;
   step (3): constructing and pre-training an attribute learning model based on the attribute vector labels for the different modulation schemes;
   step (4): constructing and pre-training a visual model for the modulation recognition;
   step (5): constructing a feature space transformation model, and constructing an intelligent data and knowledge-driven model for the modulation recognition based on the attribute learning model and the visual model;
   step (6): transferring parameters of a pre-trained visual model and a pre-trained attribute learning model and retraining the feature space transformation model;
   step (7): determining whether a training on a network is completed; and if yes, performing step (8); or if not, increasing a number of training iterations by 1 and retraining the feature space transformation model;
   step (8): inputting test set data into the network; and
   step (9): outputting a classification result;
   wherein the constructing corresponding attribute vector labels for the different modulation schemes in the step (2) specifically comprises:
   using a binary phase shift keying, a quaternary phase shift keying, a 16 quadrature amplitude modulation and a 64 quadrature amplitude modulation as recognition objects to construct a six-dimensional attribute feature vector,
   wherein each dimension indicates a different meaning, a first dimension indicates whether a base number of a classification target is binary, a second dimension indicates whether the base number of the classification target is quaternary, a third dimension indicates whether the base number of the classification target is hexadecimal, a fourth dimension indicates whether the base number of the classification target is base 64, a fifth dimension indicates whether the classification target is a phase shift keying, and a sixth dimension indicates whether the classification target is a quadrature amplitude modulation;

wherein the constructing and pre-training the attribute learning model based on the attribute vector labels for the different modulation schemes in the step (3) specifically comprises:

obtaining the attribute learning model by modifying an existing residual neural network, wherein a residual unit consists of two convolutional layers with a kernel size of 3×3;

a batch normalization layer standardizes intermediate data in a middle layer of the network, a linear correction unit is connected after each batch normalization layer as an activation function to introduce a nonlinearity into the network, a residual stack unit is constructed by sequentially connecting one 1×1 convolutional layer, two residual units, and one maximum pooling layer, the convolutional layer and the residual units are used for a feature extraction, and the maximum pooling layer is used to compress features to reduce feature dimensionalities; and when the attribute learning model is trained, trainable parameters of the network are randomly initialized: an initialized number of network training epochs is 1, a maximum number of epochs is 50, a learning rate is 0.001, a stochastic gradient descent (SGD) optimization algorithm is configured as a network training optimizer, and a mean squared error (MSE) loss function is selected to calculate a difference between network output and a real attribute label;

wherein the constructing and pre-training the visual model for the modulation recognition specifically comprises:

forming a visual training model by a multi-scale module, a global average pooling layer, a fully connected layer and a classification layer, wherein the multi-scale module first uses a convolutional layer with a kernel size of 3×1 and a stride of 2 to reduce the feature dimensionalities, then uses a plurality of convolutional layers with different kernel sizes to learn multidimensional features, and finally splices the multidimensional features; and a fully connected layer with the linear correction unit as the activation function is used after the global average pooling layer to reduce the feature dimensionalities, and an expression of the activation function is as follows:

$$f(z)=\max(0,z)$$

max(•) indicates calculating a maximum value of an object in parentheses, z indicates input data of the activation function; and when the visual model is trained, the trainable parameters of the network are randomly initialized: the initialized number of the network training epochs is 1, a maximum number of iterations is 20, the learning rate is 0.001, an Adam optimization algorithm is configured as the network training optimizer, and a cross-entropy loss function is selected to calculate the difference between the network output and the real attribute label;

wherein the constructing the feature space transformation model, and constructing the intelligent data and knowledge-driven model for the modulation recognition based on the attribute learning model and the visual model in the step (5) specifically comprises:

obtaining a first branch as a visual coding branch by removing a last classification layer of the visual model, specifically, inputting I/Q raw data $I_i$ to the visual coding branch, extracting, by the multi-scale module, the multidimensional features of the input data, flattening, by the global average pooling layer, the multidimensional features, and outputting, by the fully connected layer, a D-dimensional feature vector $\phi_1(I_i) \in \mathbb{R}^{D \times 1}$;

performing, by a second branch consisting of the attribute learning model, an attribute semantic embedding, wherein inputting the raw data $I_i$, and outputting an L-dimensional attribute feature vector $\phi_2(I_i) \in \mathbb{R}^{L \times 1}$; and transferring attribute features to a visual feature space by the feature space transformation model, wherein the feature space transformation model consists of two fully connected layers with linear correction units as activation functions, the L-dimensional attribute feature vector $\phi_2(I_i)$ is configured as an input, the feature space transformation model outputs an embedding vector $\phi_3(\phi_2(I_i)) \in \mathbb{R}^{D \times 1}$ of a same dimension as a visual feature, and an output of the feature space transformation model is as follows:

$$\phi_3(\phi_2(I_i))=f_2(W_2 f_1(W_1 \phi_2(I_i)))$$

$W_1 \in \mathbb{R}^{L \times M}$ indicates a weight matrix of a first fully connected layer, $W_2 \in \mathbb{R}^{M \times D}$ indicates a weight matrix of a second fully connected layer, M indicates an output dimension of the first fully connected layer, which is equal to an input dimension of the second fully connected layer, and $f_1(\cdot)$ and $f_2(\cdot)$ respectively indicate the activation functions connected behind the two fully connected layers and are used to introduce the nonlinearity to a network structure.

2. The intelligent data and knowledge-driven method for the modulation recognition according to claim 1, wherein the collecting the spectrum data in the step (1) specifically comprises: treating a modulation classification as a K class hypothesis testing problem, and indicating a received signal in a $k^{th}$ modulation hypothesis as $x_k(n)=s_k(n)+\omega_k(n)$, wherein $s_k(n)$ indicates an $n^{th}$ sample point of a transmitted signal of a $k^{th}$ modulation scheme, $x_k(n)$ indicates an $n^{th}$ sample point of a received signal of the $k^{th}$ modulation scheme, and $\omega_k(n)$ indicates an additive white Gaussian noise with a mean of 0 and a variance of $\sigma^2$;

indicating the received signal as a vector consisting of I/Q components, wherein $x^k=I_k+Q_k$, $x_k$ indicates a vector of $x_k(n)$, and $I_k$ and $Q_k$ respectively indicate in-phase and quadrature components of the signal; and performing determining in a K class modulation scheme based on I/Q signal samples.

3. The intelligent data and knowledge-driven method for the modulation recognition according to claim 1, wherein the transferring the parameters of the pre-trained visual model and the pre-trained attribute learning model and retraining the feature space transformation model in the step (6) specifically comprises:

first, fixing network parameters of the pre-trained visual model and the pre-trained attribute learning model;

second, randomly initializing the trainable parameters of the network, wherein the initialized number of the network training epochs is 1, the maximum number of the iterations is 100, the learning rate is 0.001, and the Adam optimization algorithm is configured as the network training optimizer; and third, inputting training data in batches into the network for a training, wherein a batch size is adjustable, a training error of each batch is back-propagated to optimize the network parameters, each fully connected layer has an $\iota_2$ parameter regularization loss term, an output of two branches passes a least square loss function to minimize a difference between an embedding output and a visual feature output, and an expression of the loss function is as follows:

$$L(W_1, W_2) = \frac{1}{N}\sum_{i=1}^{N}\|\phi_1(I_i) - f_1(W_2 f_1(W_1 \phi_2(I_i)))\|^2 + \lambda(\|W_1\|^2 + \|W_2\|^2)$$

N indicates a number of training samples, $\lambda$ is a hyper-parametric weight of two parameter regularization losses with respect to an embedding loss, and one training epoch is completed when all batches of data in the training data are back-propagated.

* * * * *